(12) United States Patent
Li

(10) Patent No.: US 9,787,194 B2
(45) Date of Patent: Oct. 10, 2017

(54) PRIMARY SIDE REGULATED ISOLATION VOLTAGE CONVERTER

(71) Applicant: Chengdu Monolithic Power Systems Co., Ltd., Chengdu (CN)

(72) Inventor: Yike Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/062,010

(22) Filed: Mar. 4, 2016

(65) Prior Publication Data

US 2016/0261198 A1 Sep. 8, 2016

(30) Foreign Application Priority Data

Mar. 5, 2015 (CN) .......................... 2015 1 0098011

(51) Int. Cl.
*H02M 7/537* (2006.01)
*H02M 3/335* (2006.01)
*H02M 1/15* (2006.01)
*H02M 1/32* (2007.01)
*H02M 1/00* (2006.01)

(52) U.S. Cl.
CPC ......... *H02M 3/33507* (2013.01); *H02M 1/15* (2013.01); *H02M 1/32* (2013.01); *H02M 3/33561* (2013.01); *H02M 2001/0032* (2013.01); *Y02B 70/16* (2013.01)

(58) Field of Classification Search
CPC ......... H02M 3/33507; H02M 3/33515; H02M 1/12; H02M 1/14; H02M 1/4266; H02M 3/33523; H02M 7/48; H02M 3/315; H02M 3/335; H02M 7/515; H02M 7/537; H02M 7/538466; H02M 7/53862
USPC ........... 363/21.12, 21.13, 39, 40, 41, 50, 55, 363/56.01, 95, 97
See application file for complete search history.

(56) References Cited

U.S. PATENT DOCUMENTS

| | | | | |
|---|---|---|---|---|
| 4,314,322 A * | 2/1982 | Plow | .................. | H02M 7/17 363/46 |
| 7,365,998 B2 * | 4/2008 | Kumar | .................. | H02M 1/15 363/39 |
| 7,696,708 B2 * | 4/2010 | Kurimoto | ............. | H02P 7/0094 318/400.01 |
| 8,884,592 B2 * | 11/2014 | Mirea | .................. | H02M 3/1563 323/271 |
| 2005/0269997 A1 * | 12/2005 | Usui | ................... | H02M 1/4225 323/207 |
| 2008/0310194 A1 * | 12/2008 | Huang | .............. | H02M 3/33507 363/21.18 |
| 2011/0149607 A1 * | 6/2011 | Jungreis | ............. | H02M 3/3376 363/21.02 |

(Continued)

*Primary Examiner* — Adolf Berhane
(74) *Attorney, Agent, or Firm* — Perkins Coie LLP

(57) ABSTRACT

A primary side regulated isolation voltage converter. The primary side regulated isolation voltage converter comprises a control module and a ripple control circuit. The control module receives the voltage feedback signal and determines whether the isolation voltage converter operates in a light load state. When the isolation voltage converter operates in a light load state, the ripple control circuit senses the ripple of an output voltage signal to generate a ripple signal, and compare the ripple signal with a ripple threshold. When the ripple signal is larger than the ripple threshold, the isolation voltage converter jumps out the light load state.

18 Claims, 7 Drawing Sheets

(56) References Cited

U.S. PATENT DOCUMENTS

| | | | | |
|---|---|---|---|---|
| 2013/0049714 A1* | 2/2013 | Chiu | ..................... | H02M 3/156 323/271 |
| 2013/0328536 A1* | 12/2013 | Ueno | .................. | H02M 3/1582 323/271 |
| 2015/0062108 A1* | 3/2015 | Archibald | ............. | H02M 3/156 345/212 |

* cited by examiner

PRIMARY SIDE REGULATED ISOLATION VOLTAGE CONVERTER

CROSS-REFERENCE TO RELATED APPLICATION

This application claims the benefit of CN application No. 201510098011.2, filed on Mar. 5, 2015, and incorporated herein by reference.

TECHNICAL FIELD

The present invention generally relates to isolation voltage converter, and more particularly but not exclusively to primary side regulated isolation voltage converter.

BACKGROUND

With the development of electronic technology and the enhancement of environmental protection requirements, efficiency and stability become important factors for voltage converters design.

In high security requirements of adapter and charger applications, an isolation voltage converter including a primary circuit and a secondary circuit may be adopted, wherein a transformer of the isolation voltage converter is used to isolate the primary circuit and the secondary circuit. In a prior art secondary side regulated isolation voltage converter, a secondary side voltage or current signal is sampled for feedback regulations. A primary switch is switched on and off based on the sampled secondary side voltage or current signal so as to realize a constant voltage or constant current control. The prior art secondary side regulated isolation voltage converter can provide precise control of voltage or current. However, the prior art secondary side regulated isolation voltage converter may require a large number of components resulting in high power consumption and low efficiency. Moreover, an expensive optical coupler may be needed during sampling the secondary side current or voltage signal. Thus, the prior art secondary regulated isolation voltage converters may result in high cost and complex structure.

Currently, in order to reduce the number of components used and to remove the optical coupler, design of isolation voltage converters sensing primary side current or voltage for feedback regulations become a challenge.

SUMMARY

Embodiments of the present invention are directed to a primary side regulated isolation voltage converter. the primary side regulated isolation voltage converter comprising: a storage element having a primary winding, a secondary winding and a tertiary winding, wherein the tertiary winding is configured to induct an output voltage signal of the isolation voltage converter to generate a voltage feedback signal; a controllable switch, coupled to the primary winding, wherein an input voltage signal is converted to the output voltage signal by switching the controllable switch on and off; a control module, configured to determine whether the isolation voltage converter is in a light load state, and further configured to receive the voltage feedback signal and to provide a first control signal based on the voltage feedback signal, wherein the first control signal is active when the voltage feedback signal is smaller than a voltage reference signal; a ripple control circuit, configured to sense ripples of the output voltage signal to generate a ripple signal when the isolation voltage converter is in the light load state, and further configured to compare the ripple signal with a ripple threshold to generate a second control signal, wherein when the ripple signal is larger than the ripple threshold, the second control signal is active; and a logic circuit, configured to receive the first control signal and the second control signal, and further configured to conduct a logic operation of the first control signal and the second control signal to generate a third control signal, wherein the third control signal is configured to turn the controllable switch on when either the first control signal or the second control signal is active.

Embodiments of the present invention are further directed to a control circuit used for a primary side regulated isolation voltage converter. The control circuit comprising: a control module, configured to determine whether the isolation voltage converter is in a light load state, and further configured to receive a voltage feedback signal generated by a tertiary winding of a transformer of the primary side regulated isolation voltage converter, and further configured to provide a first control signal based on the voltage feedback signal, wherein the first control signal is active when the voltage feedback signal is smaller than a desired reference signal; and a ripple control circuit, configured to sense ripples of the output voltage signal to generate a ripple signal when the isolation voltage converter is in the light load state, and further configured to compare the ripple signal with a ripple threshold to generate a second control signal, wherein the second control signal is active when the ripple signal is larger than the ripple threshold; and wherein the control circuit is configured to turn a controllable switch of the primary side regulated isolation voltage converter on when either the first control signal or the second control signal is active.

Embodiments of the present invention are further directed to a control method used for a primary side regulated isolation voltage converter. The control method comprising: generating a voltage feedback signal by a tertiary winding of a transformer of the primary side regulated isolation voltage converter; determining whether the isolation voltage converter is in a light load state based on the voltage feedback signal; sensing ripples of an output voltage signal to generate a ripple signal once the isolation voltage converter is in a light load state; determining whether the ripple signal is larger than a ripple threshold; and jumping out the light load state once the ripple signal is larger than the ripple threshold.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Generally, in primary side regulated control method of an isolation voltage converter, a current signal in a primary side circuit of the isolation voltage converter is sensed to calculate an output current at a secondary side circuit of the isolation voltage converter; and a tertiary winding of a transformer in the isolation voltage converter 50 is adopted to induct an output voltage in the secondary side circuit to generate a voltage signal. Finally, the current signal in the primary side circuit and the voltage signal inducted by the tertiary winding are sent to a control circuit for feedback regulations.

Figure 1:
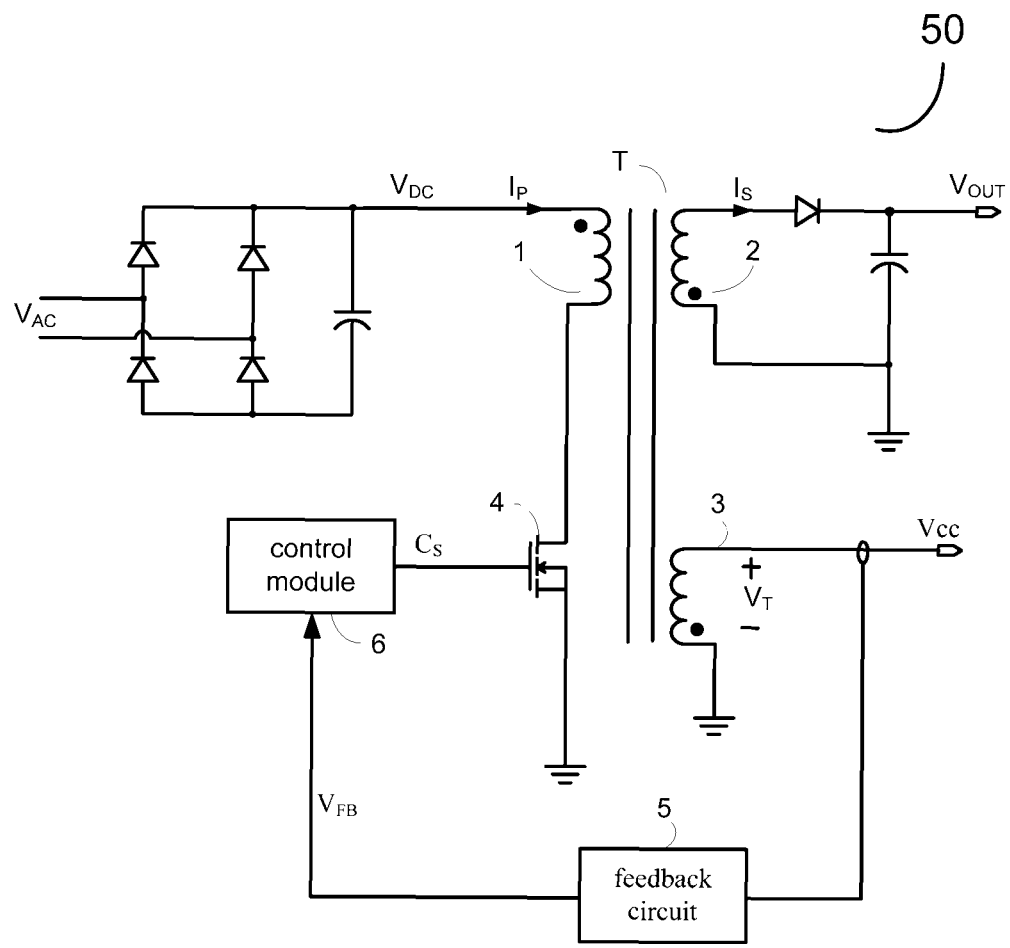
FIG. 1 illustrates a prior art block diagram of a primary side regulated isolation voltage converter 50.

FIG. 1 illustrates a prior art block diagram of a primary side regulated isolation voltage converter 50. As shown in FIG. 1, in the voltage converter 50, an alternating current (AC) voltage signal $V_{AC}$ is converted to a direct current (DC) voltage signal $V_{DC}$ through a rectifier and a blocking condenser.

The DC voltage signal $V_{DC}$ is converted to an output voltage signal $V_{OUT}$ by a switching circuit, e.g. a flyback switching circuit. The flyback switching circuit may comprise a controllable switch 4 and a transformer T having a primary winding 1, a secondary winding 2 and a tertiary winding 3. When the controllable switch 4 is ON, a primary current $I_P$ flows through the primary winding 1 in which energy is stored. When the controllable switch 4 is OFF, a secondary current $I_S$ flows through the secondary winding 2 which transmits the energy stored in the primary winding 1 to a load through a diode and a capacitor. Meanwhile, the tertiary winding 3 is configured to induct the output voltage signal $V_{OUT}$ to generate an inducted signal $V_T$, wherein the inducted signal $V_T$ is proportional to the output voltage signal $V_{OUT}$. When the secondary current signal $I_S$ decreases to zero, the inducted signal $V_T$ is equal to zero.

The isolation voltage converter 50 further comprises a feedback circuit 5 coupled to the tertiary winding 3. The inducted signal $V_T$ varies following the change of the output voltage signal $V_{OUT}$. The feedback circuit 5 is configured to convert the inducted signal $V_T$ to a voltage feedback signal $V_{FB}$ which is indicative of the output voltage signal $V_{OUT}$.

The isolation voltage converter 50 further comprises a control module 6 configured to receive the voltage feedback signal $V_{FB}$. The control module 6 is used to generate a control signal $C_S$ which is provided to a control terminal of the controllable switch 4 based on the feedback signal $V_{FB}$. The control signal $C_S$ is configured to switch the controllable switch 4 on and off so as to regulate the output voltage signal $V_{OUT}$ to a constant voltage value.

Figure 2:
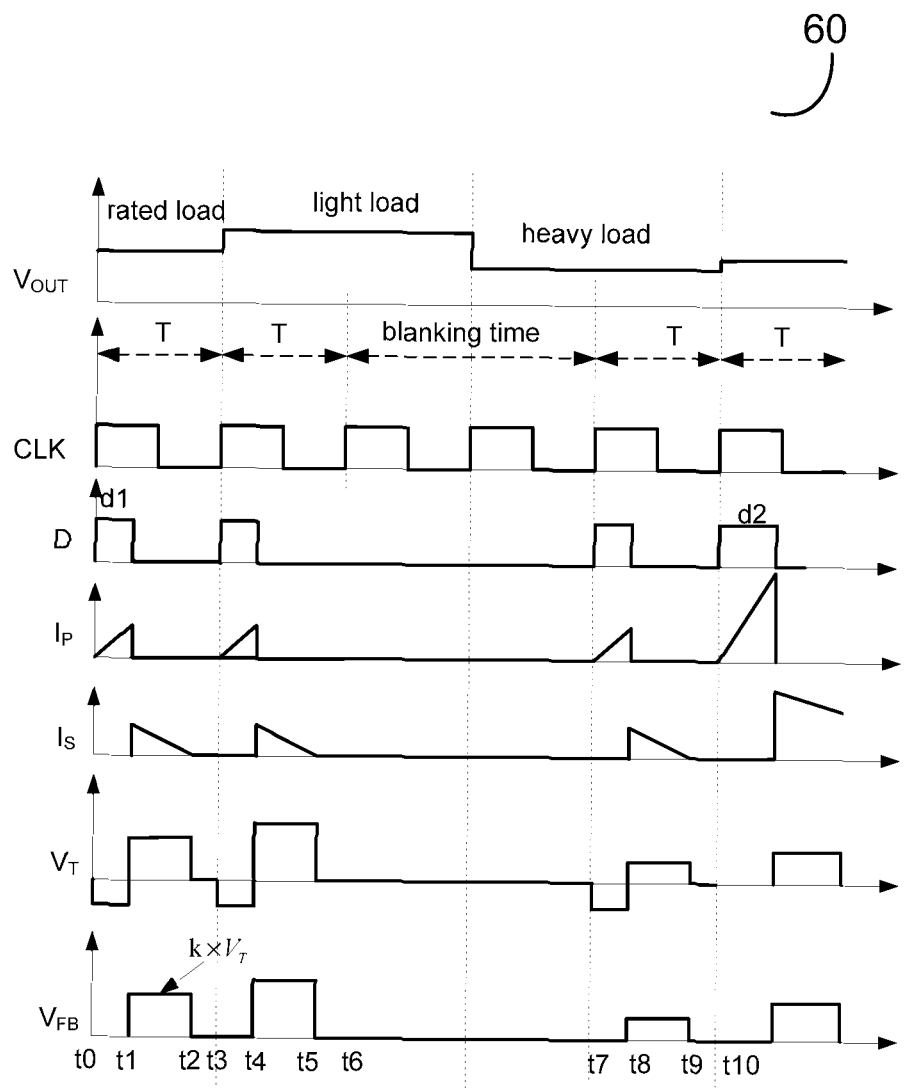
FIG. 2 illustrates an operation waveform diagram 60 of the isolation voltage converter 50.

FIG. 2 illustrates an operation waveform diagram 60 of the isolation voltage converter 50. As shown in FIG. 2, the waveform diagram 60 illustrates that the isolation voltage converter 50 may transit between a normal load state and a light load state. In FIG. 2, the normal load state may comprise a rated load state and a heavy load state, wherein the rated load state indicates that the isolation voltage converter 50 drives a rated load, and the heavy load state indicates that the isolation voltage converter 50 drives a heavy load heavier than the rated load. When the isolation voltage converter 50 is in the normal load state, the isolation voltage converter 50 operates in a first operation mode, e.g. Pulse Width Modulation (PWM) operation mode. When the isolation voltage converter 50 is in the light load state, the isolation voltage converter 50 operates in a second operation mode, e.g. skip-cycle operation mode. In one embodiment, the light load state comprises a no load state.

In the exemplary embodiment of FIG. 2, an operation cycle of the isolation voltage converter 50 is labeled as T, and a duty cycle of the isolation voltage converter 50 is labeled as D.

During time t0-t3, the isolation voltage converter 50 operates in a PWM operation mode, and the value of the duty cycle is d1. At time t3, the isolation voltage converter 50 transits from the rated load state to the light load state. During time t3-t4, the isolation voltage converter 50 repeats the operation of time t0-t1. During time t4-t5, the voltage feedback signal $V_{FB}$ increases following the increase in the output voltage signal $V_{OUT}$. The control module 6 may regulate the isolation voltage converter 50 to operate in the skip-cycle operation mode from time t6 to time t7 once the voltage feedback signal $V_{FB}$ reaches a light load threshold, which indicates that the isolation voltage converter 50 enters into the light load state. In the exemplary embodiment of FIG. 2, when the isolation voltage converter 50 is in the light load state, the isolation voltage converter 50 operates in skip-cycle operation mode. During the skip-cycle operation mode, there is a blanking time in which the controllable switch 4 stops to switch on and off. In FIG. 2, the blanking time of the isolation voltage converter 50 is illustrated as two operation cycles (time t6-t7). However, one person of ordinary skill in the art may understand that any number of operation cycles of the blanking time can be chose in compliance with different applications.

When the isolation voltage converter 50 operates in the skip-cycle operation mode, the controllable switch 4 is turned off and the tertiary winding 3 fails to induct the output voltage signal $V_{OUT}$ so that the voltage feedback signal $V_{FB}$ is equal to zero. However, if the load of the isolation voltage converter 50 is changed during the blanking time, the voltage feedback signal $V_{FB}$ fails to track the change of the load. For example, in FIG. 2, during time t6-t7, the output voltage signal $V_{OUT}$ drops off since the isolation voltage converter 50 transits to the heavy load state. However, the control module 6 fails to regulate the isolation voltage converter 50 to recover from the skip-cycle operation mode to the PWM operation mode since the voltage feedback signal $V_{FB}$ cannot track the change of the load and is still equal to zero. Thus, the control module 6 fails to regulate the output voltage signal $V_{OUT}$ in compliance with the change of the load. As shown in FIG. 2, the control module 6 will not be able to regulate the output voltage signal $V_{OUT}$ based on the voltage feedback signal $V_{FB}$ until the blanking time is over. For instance, at time t7, the blanking time ends and thus during time t8-t9, the voltage feedback signal $V_{FB}$ can follow the drop in the output voltage signal $V_{OUT}$. Consequently, the control module 6 pulls up the output voltage signal $V_{OUT}$ by increasing the duty cycle D (the value of the duty cycle D is changed from d1 to d2) based on the voltage feedback signal $V_{FB}$. That's to say, when the isolation voltage converter 50 recovers from the light load state to the normal load state, the voltage feedback signal $V_{FB}$ may have delay in indicating the change of the output voltage signal $V_{OUT}$. Therefore, the transient response of the isolation voltage converter 50 is slow.

In another embodiment, even if the isolation voltage converter 50 has only one operation mode, once the isolation voltage converter 50 enters into the light load state, the voltage feedback signal $V_{FB}$ may still have delay in indicating the change of the output voltage signal $V_{OUT}$ since the switching on time of the controllable switch 4 is limited, which results in slow transient response and low efficiency.

Figure 3:
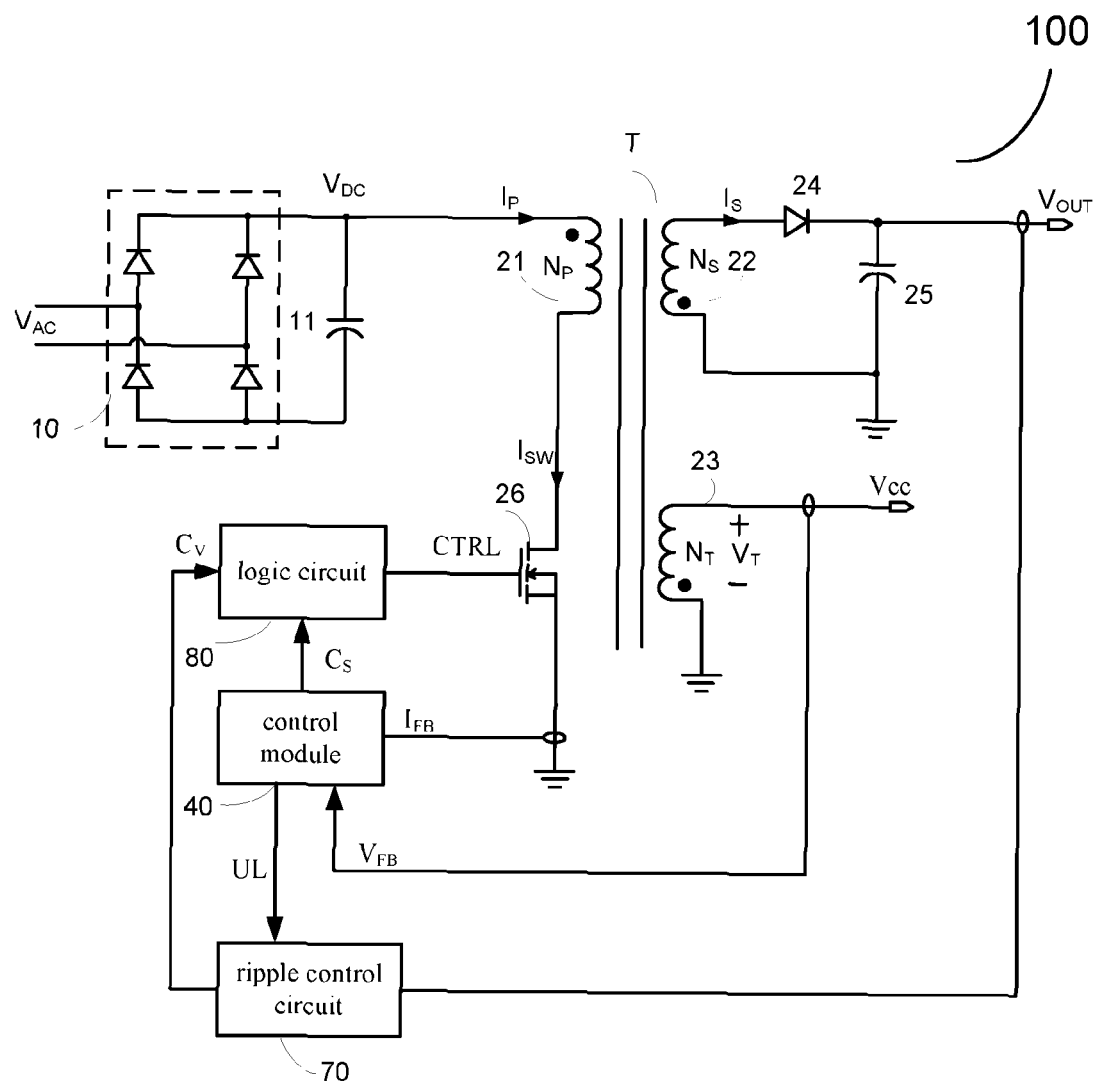
FIG. 3 illustrates a block diagram of a primary side regulated isolation voltage converter 100 in accordance with an embodiment of the present invention.

FIG. 3 illustrates a block diagram of an isolation voltage converter 100 in accordance with an embodiment of the present invention.

As shown in FIG. 3, The isolation voltage converter 100 may comprise a rectifier 10 configured to receive an AC voltage signal $V_{AC}$, and further configured to convert the AC voltage signal $V_{AC}$ to a DC voltage signal $V_{DC}$ through a blocking condenser 11.

The isolation voltage converter 100 may further comprise a switching circuit. In the exemplary embodiment of FIG. 3, the switching circuit is illustrated as to have a flyback topology comprising a transformer T, a controllable switch 26, a diode 24 and a capacitor 25. The switching circuit may be configured to convert the DC voltage signal $V_{DC}$ to an output voltage signal $V_{OUT}$ by switching the controllable switch 26 on and off. The transformer T may comprise a primary winding 21, a secondary winding 22 and a tertiary winding 23, wherein the number of turns of the primary winding 21, the secondary winding 22 and the tertiary winding 23 are illustrated as $N_P$, $N_S$ and $N_T$ respectively. When the controllable switch 26 is ON, a primary current $I_P$ flows through the primary winding 21 in which energy is stored. When the controllable switch 26 is OFF, a secondary current $I_S$ flows through the secondary winding 2 which transmits the energy stored in the primary winding 1 to a load through the diode 24. Finally, the voltage signal across the secondary winding 22 is filtered by the capacitor 25 to get an output voltage signal $V_{OUT}$. The tertiary winding 23 may be configured to induct the output voltage signal $V_{OUT}$ to generate the inducted signal $V_T$, wherein the inducted signal $V_T$ across the tertiary winding 3 is proportional to the output voltage signal $V_{OUT}$. When the controllable switch 26 is ON, the inducted signal $V_T$ is equal to $$-\frac{N_T}{N_P} V_{DC}.$$

When the controllable switch 26 is in OFF, the inducted signal $V_T$ is equal to $$\frac{N_T}{N_P} V_{DC}.$$

However, one person of ordinary skill in the art may understand that the flyback topology is illustrated as an exemplary embodiment of FIG. 3, and in other embodiment, the switching circuit may comprise other suitable topologies, e.g. forward topology, isolation bridge topology and so on. Moreover, the controllable switch 26 is illustrated as a Metal Oxide Semiconductor Field Effect Transistor (MOSFET) in FIG. 3, in other embodiment, the controllable switch 26 may comprise other suitable power switches, e.g. Junction Field Effect Transistor (JFET) etc.

In the exemplary embodiment of FIG. 3, the isolation voltage converter 100 may further comprise a control module 40. The control module 40 may be configured to receive a voltage feedback signal $V_{FB}$ and further configured to provide a first control signal $C_S$ and an indicator signal UL based on the voltage feedback signal $V_{FB}$, wherein the indicator signal UL indicates whether the isolation voltage converter 100 is in a light load state. In another embodiment, the control module 40 may be further configured to receive a current feedback signal $I_{FB}$ and provide the first control signal $C_S$ and the indicator signal UL based on both the voltage feedback signal $V_{FB}$ and the current feedback signal $I_{FB}$. When the voltage feedback signal $V_{FB}$ is smaller than a voltage reference signal, the first control signal $C_S$ is active. The first control signal $C_S$ may be a logic signal having a logic high state and a logic low state. In one embodiment, the logic high state of the first control signal $C_S$ is indicative of an active state. In another embodiment, the logic low state of the first control signal $C_S$ is indicative of an active state.

The control module 40 may comprise at least one operation mode, for example, in one embodiment, the control module 40 may control the isolation voltage converter 100 to operate in a PWM operation mode; in one embodiment, the control module 40 may control the isolation voltage converter 100 to operate in a PFM operation mode; and in one embodiment, the control module 40 may control the isolation voltage converter 100 to operate in multi operation modes. In one embodiment, the control module 40 may control the isolation voltage converter 100 to operate in a PWM operation mode during the normal load state and to operate in a Pulse Frequency Modulation (PFM) operation mode during a light load state. In one embodiment, the control module 40 may control the isolation voltage converter 100 to operate in a PWM operation mode during the normal load state and to operate in a skip-cycle operation mode during the light load state. In addition, in one embodiment, each of the operation modes may adopt a voltage control method to regulate the output voltage $V_{OUT}$; in one embodiment, each of the operation modes may adopt a current control method to regulate the output current $I_{OUT}$; and in one embodiment, each of the operation modes may adopt both a voltage control method and a current control method to regulate both the output voltage $V_{OUT}$ and the output current $I_{OUT}$.

In the exemplary embodiment of FIG. 3, the isolation voltage converter 100 may further comprise a ripple control circuit 70 having a first input terminal, a second input terminal and an output terminal, wherein the first input terminal of the ripple control circuit 70 is coupled to an output terminal of the isolation voltage converter 100 to receive the output voltage signal $V_{OUT}$; and the second input terminal of the ripple control circuit 70 is coupled to the control module 40 to receive the indicator signal UL. When the isolation voltage converter 100 operates in the light load state, the ripple control circuit 70 may be configured to sense ripples of the output voltage signal $V_{OUT}$ to generate a ripple signal, and further configured to compare the ripple signal with a ripple threshold to generate a second control signal $C_V$ at the output terminal of the isolation voltage converter 100. In one embodiment, when the ripple signal is larger than the ripple threshold, the second control signal $C_V$ is active so that the controllable switch 26 is turned on. The second control signal $C_V$ may be a logic signal having a logic high state and a logic low state. In one embodiment, the logic high state of the second control signal $C_V$ is indicative of an active state. In another embodiment, the logic low state of the second control signal $C_V$ is indicative of an active state.

In the exemplary embodiment of FIG. 3, the isolation voltage converter 100 may further comprise a logic circuit 80 having a first input terminal, a second input terminal and an output terminal, wherein the first input terminal of the logic circuit 80 is coupled to the control module 40 to receive the first control signal $C_S$; the second input terminal of the logic circuit 80 is coupled to the ripple control circuit 70 to receive the second control signal $C_V$; and the logic circuit 80 is configured to conduct a logic operation of the first control signal $C_S$ and the second control signal $C_V$ to generate a third control signal CTRL at the output terminal which is provided to the control terminal of the controllable switch 26. The third control signal CTRL is configured to switch the controllable switch 26 on and off so as to regulate the output voltage signal $V_{OUT}$ to a desired constant voltage value. In one embodiment, either the first control signal $C_S$ or the second control signal $C_V$ is active, the controllable switch 26 is turned on.

Figure 4:
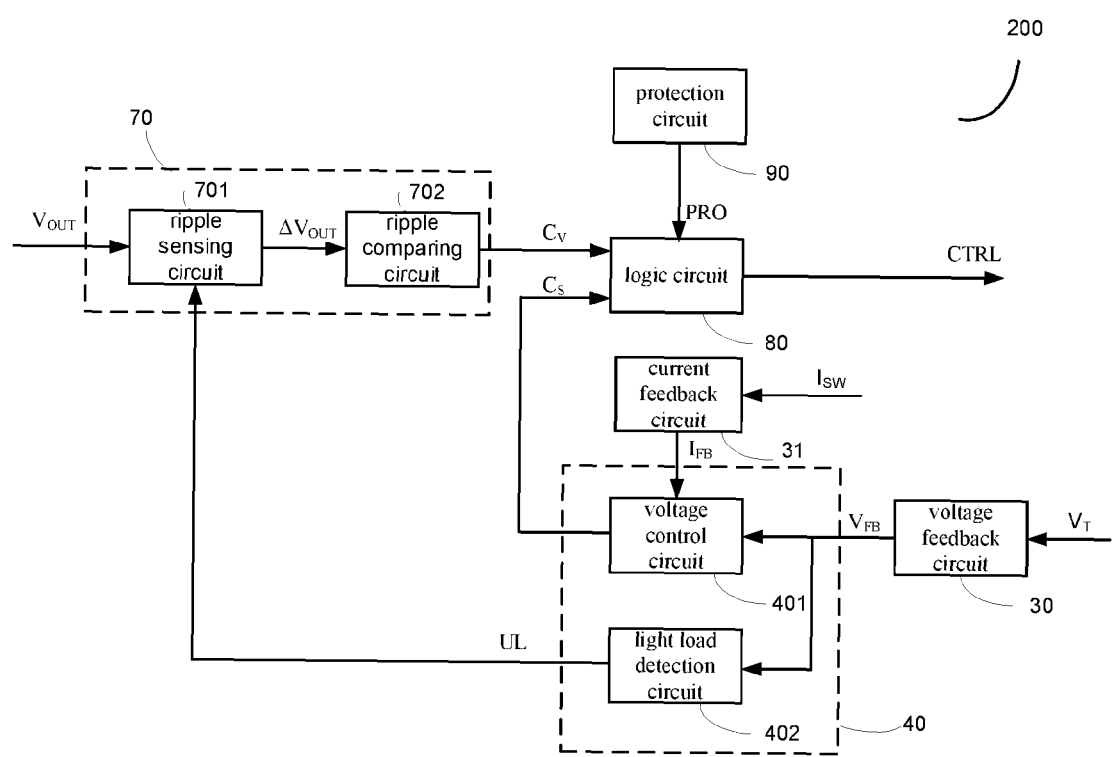
FIG. 4 illustrates a block diagram of a control circuit 200 of the primary side regulated isolation voltage converter 100 in accordance with one embodiment of the present invention.

FIG. 4 illustrates a block diagram of a control circuit 200 of the isolation voltage converter 100 in accordance with one embodiment of the present invention. The control circuit 200 may comprise a voltage feedback circuit 30, a control module 40, a ripple control circuit 70, and a logic circuit 80.

In the exemplary embodiment of FIG. 4, the voltage feedback circuit 30 has an input terminal and an output terminal, wherein the input terminal is coupled to the tertiary winding 23 to receive the inducted signal $V_T$; and the voltage feedback circuit 30 is configured to provide the voltage feedback signal $V_{FB}$ based on the inducted signal $V_T$ at the output terminal, wherein the voltage feedback signal $V_{FB}$ is indicative of the change of the output voltage signal $V_{OUT}$. In one embodiment, the voltage feedback signal $V_{FB}$ is equal to $$k \times \frac{N_T}{N_S} \times V_{OUT},$$

wherein k is indicative of a proportionality coefficient related to resistances of a resistor divider of the voltage feedback circuit 30. Thus, the voltage feedback signal $V_{FB}$ is proportional to the output voltage signal $V_{OUT}$ and the number of turns $N_T$ of the tertiary winding 23, and inversely proportional to the number of turns $N_S$ of the secondary winding 22.

In the exemplary embodiment of FIG. 4, the control module 40 may comprise a voltage control circuit 401 and a light load detection circuit 402.

The voltage control circuit 401 may have an input terminal and an output terminal, wherein the input terminal of the voltage control circuit 401 is coupled to the voltage feedback circuit 30 to receive the voltage feedback signal $V_{FB}$; and the voltage control circuit 401 is configured to generate the first control signal $C_S$ based on the voltage feedback signal $V_{FB}$. The voltage control circuit 401 may comprise any suitable modules for realizing different control methods in different applications, e.g. PWM control method, Constant On Time (COT) control method etc. For example, in a COT control method, the voltage control circuit 401 may comprise a COT generator, a comparator and a logic module, wherein the COT generator is configured to generate a COT signal determining an on time of the controllable switch 26; the second comparing circuit is configured to compare the error signal with a reference signal so as to generate a comparing signal; and the logic module is configured to conduct a logic operation of the COT signal and the comparing signal to generate the first control signal $C_S$.

The light load detection circuit 402 may have an input terminal and an output terminal, wherein the input terminal of the light load detection circuit 402 is coupled to the voltage feedback circuit 30 to receive the voltage feedback signal $V_{FB}$; and the light load detection circuit 402 is configured to generate the indicator signal UL based on the voltage feedback signal $V_{FB}$. In one embodiment, the light load detection circuit 402 is configured to compare the voltage feedback signal $V_{FB}$ with a light load threshold. When the voltage feedback signal $V_{FB}$ is larger than the light load threshold, the indicator signal UL is active indicating that the isolation voltage converter 100 is in the light load state. Otherwise, the isolation voltage converter 100 is in the normal load state.

In the exemplary embodiment of FIG. 4, the ripple control circuit 70 may comprise a ripple sense circuit 701 and a ripple comparing circuit 702, wherein the ripple sense circuit 701 may be configured to sense ripples of the output voltage signal $V_{OUT}$ to generate a ripple signal $\Delta V_{OUT}$, and the ripple comparing circuit 702 may be configured to compare the ripple signal $\Delta V_{OUT}$ with the ripple threshold to generate the second control signal $C_V$.

In one embodiment, for example, in a voltage and current double loops control circuit, the control circuit 200 may further comprise a current feedback circuit 31. The current feedback circuit 31 may be configured to sense a current $I_{SW}$ flowing through the controllable switch 26 to generate a current feedback signal $I_{FB}$, wherein the peak value of the current signal $I_{SW}$ is indicative of an output current in the secondary side circuit. Thus, the current feedback signal $I_{FB}$ is indicative of an output current in the secondary side circuit. In such an application, the voltage control circuit 401 may be configured to receive the voltage feedback signal $V_{FB}$ and the current feedback signal $I_{FB}$, and further configured to provide the first control signal $C_S$ and the indicator signal UL based on the voltage feedback signal $V_{FB}$ and the current feedback signal $I_{FB}$.

In one embodiment, the control circuit 200 may further comprise a protection circuit 90 configured to receive at least one protection signal, e.g., an over-current signal, an over-temperature signal, an over-voltage signal etc. the protection circuit 90 is configured to compare the at least one protection signal with at least one threshold signal respectively to provide at least one control signal to the logic circuit 80. In such an embodiment, the logic circuit 80 is configured to conduct a logic operation of the first control signal $C_S$, the second control signal $C_V$ and the at least one control signal to generate the third control signal CTRL.

In the exemplary embodiment of FIG. 4, the control module 40, the logic circuit 80 and the ripple comparing circuit 702 may be integrated together illustrated as an Integrated Circuit (IC) having a voltage feedback pin received the voltage feedback signal $V_{FB}$, a current feedback pin receiving the current feedback signal $I_{FB}$, a ripple pin receiving the ripple signal $\Delta V_{OUT}$ and a control pin providing the third control signal CTRL. In another embodiment, the controllable switch 26 can be integrated in the IC. In such an application, a new pin used for eliciting the drain of the controllable switch 26 is added. Meanwhile, the current feedback pin and the control pin can be eliminated.

Figure 5:
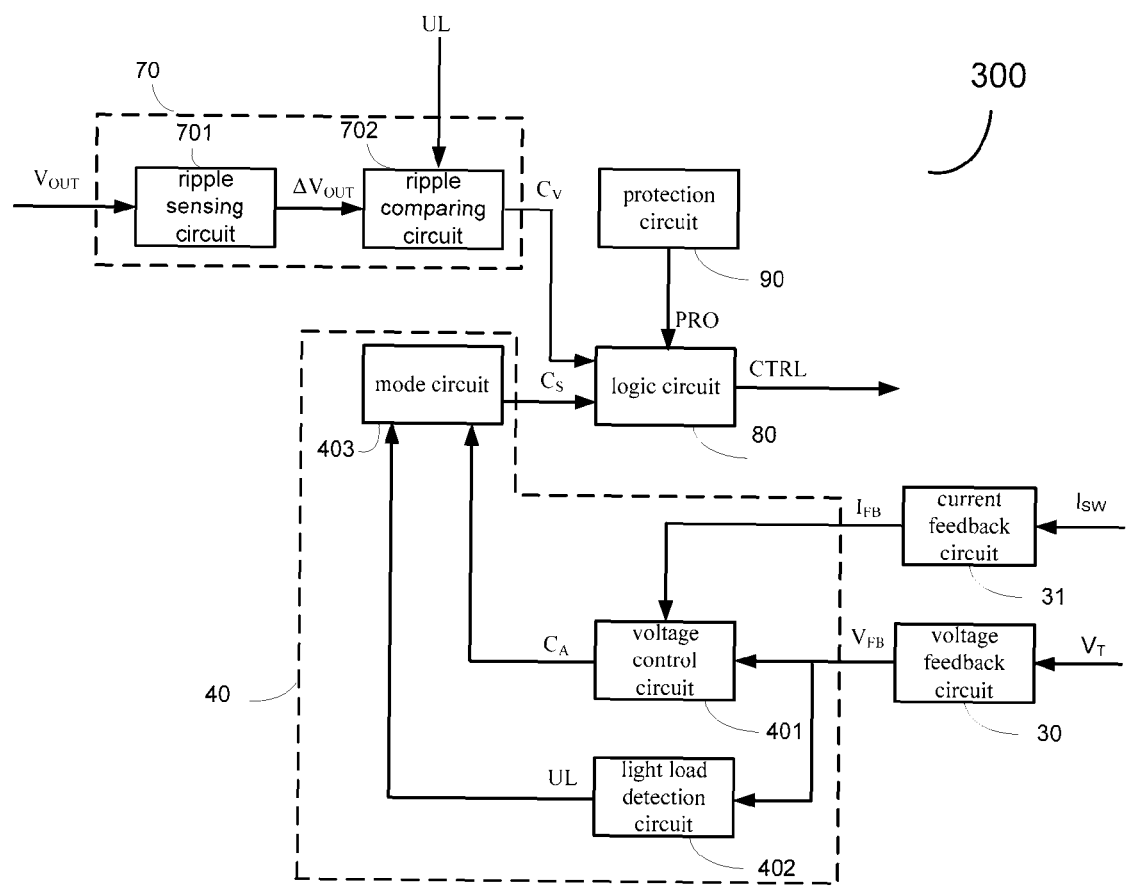
FIG. 5 illustrates a block diagram of a control circuit 300 of the primary side regulated isolation voltage converter 100 in accordance with one embodiment of the present invention.

FIG. 5 illustrates a block diagram of a control circuit 300 of an isolation voltage converter in accordance with one embodiment of the present invention. Compared to the control circuit 200 of FIG. 4, the control circuit 300 may comprise a different control module 40. The control module 40 in FIG. 5 may comprise a voltage control circuit 401 and a light load detection circuit 402 same as that of the control circuit 200. Besides, the control module 40 in FIG. 5 may further comprise a mode circuit 403 configured to determine the isolation voltage converter 100 to operate in the first operation mode or the second operation mode. When the isolation voltage converter 100 is in the normal load state, the isolation voltage converter 100 operates in the first operation mode. When the isolation voltage converter 100 is in the light load state, the isolation voltage converter 100 operates in the second operation mode, wherein the light load state may comprise a no load state. In one embodiment, the first operation mode is PWM operation mode, and the second operation mode is skip-cycle operation mode, i.e. the controllable switch 26 stop to switch on and off in a plurality of cycles during the light load state. In another embodiment, the first operation mode is PWM operation mode, and the second operation mode is PFM operation mode, i.e. the operation frequency of the controllable switch 26 decreases during the light load state. In another embodiment, the first operation mode is PFM operation mode, and the second operation mode is skip-cycle operation mode.

In the exemplary embodiment of FIG. 5, the voltage control circuit 401 is configured to generate a fourth control signal $C_A$ based on the voltage feedback signal $V_{FB}$. The mode circuit 403 may have a first input terminal, a second input terminal and an output terminal, wherein the first input terminal of the mode circuit 403 is coupled to the voltage control circuit 401 to receive the fourth control signal $C_A$; and the second input terminal of the mode circuit 403 is coupled to the light load detection circuit 402 to receive the indicator signal UL. The mode circuit 403 is configured to set the first operation mode and the second operation mode of the isolation voltage converter 100 and further configured to provide the first control signal $C_S$ at the output terminal based on the voltage feedback signal $V_{FB}$ and the fourth control signal $C_A$.

In the exemplary embodiment of FIG. 5, the control module 40, the logic circuit 80 and the ripple comparing circuit 702 may be integrated together illustrated as an Integrated Circuit (IC) having a voltage feedback pin receiving the voltage feedback signal $V_{FB}$, a current feedback pin receiving the current feedback signal $I_{FB}$, a ripple pin receiving the ripple signal $\Delta V_{OUT}$ and a control pin providing the third control signal CTRL. In another embodiment, the controllable switch 26 can be integrated in the IC. In such an application, a new pin used for eliciting the drain of the controllable switch 26 is added. Meanwhile, the current feedback pin and the control pin can be eliminated.

Figure 6:
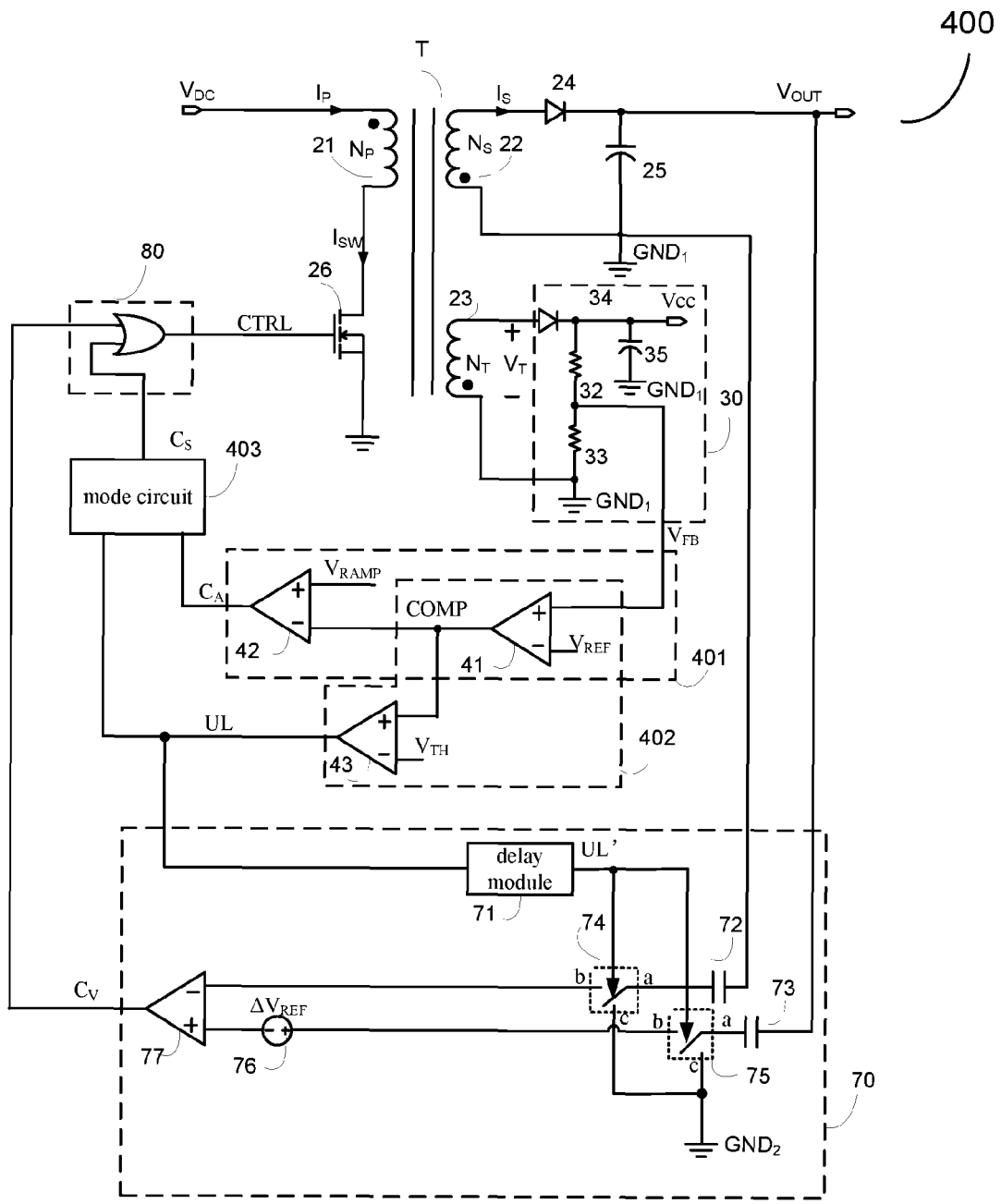
FIG. 6 schematically illustrates a primary side regulated isolation voltage converter 400 in accordance with one embodiment of the present invention.

FIG. 6 schematically illustrates an isolation voltage converter 400 in accordance with an embodiment of the present invention.

In the exemplary embodiment of FIG. 6, the voltage feedback circuit 30 is coupled to the tertiary winding 23 to receive the inducted signal $V_T$. The voltage feedback circuit 30 may be configured to convert the inducted signal $V_T$ to a voltage feedback signal $V_{FB}$. In one embodiment, the voltage feedback signal $V_{FB}$ is equal to $$k \times \frac{N_T}{N_S} \times V_{OUT},$$

wherein k is indicative of a proportionality coefficient related to resistances of resistor 32, 33 in the voltage feedback circuit 30. Thus, the voltage feedback signal $V_{FB}$ is proportional to the output voltage signal $V_{OUT}$ and the number of turns of the tertiary winding 23, and inversely proportional to the number of turns of the secondary winding 22. Meanwhile, the tertiary winding 23 is further configured to provide a supply voltage $V_{CC}$ for the isolation voltage converter 400 through diode 34 and capacitor 35.

In the exemplary embodiment of FIG. 6, the voltage control circuit 401 may comprise an amplifying circuit 41 and a first comparing circuit 42. The amplifying circuit 41 having a first input terminal, a second input terminal and an output terminal, wherein the first input terminal of the amplifying circuit 41 is configured to receive the voltage feedback signal $V_{FB}$; the second input terminal of the amplifying circuit 41 is configured to receive a voltage reference signal $V_{REF}$; and the amplifying circuit 41 is configured to amplify difference of the voltage feedback signal $V_{FB}$ and the voltage reference signal $V_{REF}$ to generate an error signal COMP. The first comparing circuit 42 having a first input terminal, a second input terminal and an output terminal, wherein the first input terminal of the first comparing circuit 42 is configured to receive the error signal COMP; the second input terminal of the first comparing circuit 42 is configured to receive a ramp signal $V_{RAMP}$; and the first comparing circuit 42 is configured to compare the error signal COMP with the ramp signal $V_{RAMP}$ so as to generate the fourth control signal $C_A$.

In the exemplary embodiment of FIG. 6, the light load detection circuit 402 may comprise the amplifying circuit 41 of the voltage control circuit 401. Besides, the light load detection circuit 402 may further comprise a second comparing circuit 43 having a first input terminal, a second input terminal and an output terminal, wherein the first input terminal of the second comparing circuit 43 is configured to receive the error signal COMP; the second input terminal of the second comparing circuit 43 is configured to receive a light load threshold $V_{TH}$; and the second comparing circuit 43 is configured to compare the error signal COMP with the light load threshold $V_{TH}$ so as to generate the indicator signal UL at the output terminal. When the error signal COMP is larger than the light load threshold $V_{TH}$, the indicator signal UL is active indicating that the isolation voltage converter 400 goes into a light load state.

In the exemplary embodiment of FIG. 6, the ripple control circuit 70 may comprise a first capacitor 72, a second capacitor 73, a voltage source 76 and a comparator 77 having a first input terminal, a second input terminal and an output terminal. When the isolation voltage converter 400 operates in a normal load state, e.g. a rated load state or a heavy load state, the first capacitor 72 is coupled between a first logic ground $GND_1$ and a second logic ground $GND_2$, and the second capacitor is coupled between the output terminal of the isolation voltage converter 400 and the second logic ground $GND_2$. When the isolation voltage converter 400 operates in a light load state or a no load state, the first capacitor 72 is coupled between the first logic ground $GND_1$ and the first input terminal of the comparator 77, and the second capacitor is coupled between the output terminal of the isolation voltage converter 400 and the second input terminal of the comparator 77 through the voltage source 76. In one embodiment, the voltage source 76 has a positive terminal and a negative terminal, wherein the positive terminal of the voltage source 76 is coupled to the second capacitor 73; and the negative terminal of the voltage source 76 is coupled to the second input terminal of the comparator 77. The change voltage across the second capacitor 73 is indicative of the ripple signal $\Delta V_{OUT}$ of the output voltage signal $V_{OUT}$. The comparator 77 is configured to compare the ripple signal $\Delta V_{OUT}$ to the voltage source 76 to generate the second control signal $C_V$ at the output terminal.

In one embodiment, the ripple control circuit 70 may further comprise a delay module 71, a first switch 74 and a second switch 75. The delay module 71 has an input terminal and an output terminal. The delay module 71 is configured to receive the indicator signal UL at the input terminal, and further configured to provide a delay signal UL' at the output terminal, wherein the delay signal UL' is active after the isolation voltage converter 400 operates in a light load state or a no load state. The first switch 74 and the second switch 75 have a first terminal a, a second terminal b, a third terminal c and a control terminal respectively. The first capacitor 72 is coupled between the first logic ground $GND_1$ and the first terminal a of the first switch 74; the second terminal b of the first switch 74 is coupled to the first input terminal of the comparator 77; the third terminal c of the first switch 74 is coupled to the second logic ground $GND_2$; and the control terminal of the first switch 74 is configured to receive the delay signal UL'. The second capacitor 73 is coupled between the second logic ground $GND_2$ and the first terminal a of the second switch 75; the second terminal b of the second switch 75 is coupled to the second input terminal of the comparator 77 through the voltage source 76; the third terminal c of the second switch 75 is coupled to the second logic ground $GND_2$; and the control terminal of the second switch 75 is configured to receive the delay signal UL'. When the isolation voltage converter 400 operates in a normal load state, e.g. a rated load state or a heavy load state, the first terminal a of the first switch 74 is connected to the third terminal c of the first switch 74; and the first terminal a of the second switch 75 is connected to the third terminal c of the second switch 75. When the isolation voltage converter 400 operates in a light load state or a no load state, i.e., the delay signal UL' is active, the first terminal a of the first switch 74 is connected to the second terminal b of the first switch 74; and the first terminal a of the second switch 75 is connected to the second terminal b of the second switch 75.

In the exemplary embodiment of FIG. 6, the logic circuit 80 may comprise an OR logic gate having a first input terminal, a second input terminal and an output terminal, wherein the first input terminal of the OR logic gate is coupled to the mode circuit 403 to receive the first control signal $C_S$; the second input terminal of the OR logic gate is coupled to the ripple control circuit 70 to receive the second control signal $C_V$, and the OR logic gate is configured to conduct an OR logic operation of the first control signal $C_S$ and the second control signal $C_V$ to generate a third control signal CTRL at the output terminal which is provided to the control terminal of the controllable switch 26. In one embodiment, either the first control signal $C_S$ or the second control signal $C_V$ is active, the controllable switch 26 is turned on.

Figure 7:
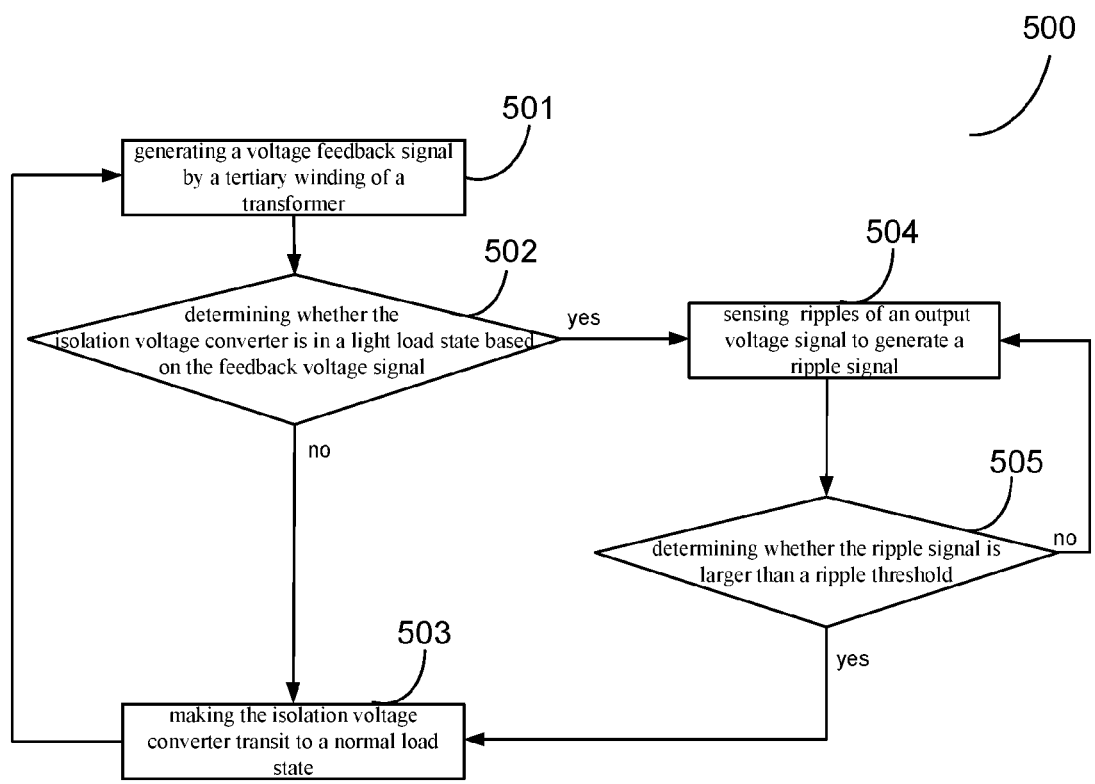
FIG. 7 illustrates a control method of the primary side regulated isolation voltage converter 100 in FIG. 3 in accordance with one embodiment of the present invention.

FIG. 7 illustrates a control method of the isolation voltage converter 100 in FIG. 3 in accordance with one embodiment of the present invention. As shown in FIG. 7, the control method may comprise steps 501-505.

In step 501, generating a voltage feedback signal by a tertiary winding of a transformer.

In step 502, determining whether the isolation voltage converter 100 is in a light load state based on the voltage feedback signal. If the isolation voltage converter 100 operates in the light load state, turns to step 504; or turns to step 503.

In step 503, making the isolation voltage converter 100 operates changing to a normal load state. Then continue to the step 501. In one embodiment, during the normal load state, the isolation voltage converter 100 has a first operation mode, e.g. PWM operation mode, COT operation mode etc.

In step 504, sensing ripples of the output voltage signal $V_{OUT}$ of the isolation voltage converter 100 to generate a ripple signal $\Delta V_{OUT}$.

In step 505, determining whether the ripple signal $\Delta V_{OUT}$ is larger than a ripple threshold $V_{TH2}$. When the ripple signal $\Delta V_{OUT}$ is larger than the ripple threshold $V_{TH2}$, turns to step 503; or back to step 504.

In one embodiment, the isolation voltage converter 100 comprises a controllable switch 26, wherein an input voltage signal $V_{IN}$ is converted to the output voltage signal $V_{OUT}$ by switching the controllable switch 26 on and off. When the isolation voltage converter 100 is in the light load state, the controllable switch 26 stops to switch on and off.

In one embodiment, the isolation voltage converter 100 comprises a controllable switch 26, wherein an input voltage signal $V_{IN}$ is converted to the output voltage signal $V_{OUT}$ by switching the controllable switch 26 on and off. When the isolation voltage converter is in the light load state, switching frequency of the controllable switch 26 decreases.

In one embodiment, sensing a ripple signal of the output voltage signal $V_{OUT}$ once the isolation voltage converter is in a light load state comprises using a ripple sense circuit. For example, in FIG. 6, the ripple sense circuit has a first input terminal, a second input terminal, a first output terminal and a second output terminal. The ripple sense circuit comprises a first capacitor 72 and a second capacitor 73.

The first capacitor 72 has a first terminal and a second terminal, the first terminal of the first capacitor 72 operated as the first input terminal of the ripple sense circuit is connected to a first logic ground $GND_1$, when the isolation voltage converter 400 is in a normal load state, the second terminal of the first capacitor 72 is connected to a second logic ground $GND_2$; when the isolation voltage converter 400 is in a light load state, the second terminal of the first capacitor 72 operated as the first output terminal of the ripple sense circuit;

The second capacitor 73 has a first terminal and a second terminal, the first terminal of the second capacitor 73 operated as the second input terminal of the ripple sense circuit is connected to an output terminal of the isolation voltage converter 400; when the isolation voltage converter 400 is in the normal load state, the second terminal of the second capacitor 73 is connected to the second logic ground $GND_2$; when the isolation voltage converter 400 is in the light load state, the second terminal of the second capacitor 73 operated as the second output terminal of the ripple sense circuit. The difference of the first output terminal of the ripple sense circuit and the second output terminal of the ripple sense circuit is indicative of the ripple signal $\Delta V_{OUT}$.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A primary side regulated isolation voltage converter, comprising:
    a storage element having a primary winding, a secondary winding and a tertiary winding, wherein the tertiary winding is configured to induct an output voltage signal of the isolation voltage converter to generate a voltage feedback signal;
    a controllable switch, coupled to the primary winding, wherein an input voltage signal is converted to the output voltage signal by switching the controllable switch on and off;
    a control module, configured to determine whether the isolation voltage converter is in a light load state, and further configured to receive the voltage feedback signal and to provide a first control signal based on the voltage feedback signal, wherein the first control signal is active when the voltage feedback signal is smaller than a voltage reference signal;
    a ripple control circuit, configured to sense ripples of the output voltage signal to generate a ripple signal when the isolation voltage converter is in the light load state, and further configured to compare the ripple signal with a ripple threshold to generate a second control signal, wherein when the ripple signal is larger than the ripple threshold, the second control signal is active; and
    a logic circuit, configured to receive the first control signal and the second control signal, and further configured to conduct a logic operation of the first control signal and the second control signal to generate a third control signal, wherein the third control signal is configured to turn the controllable switch on when either the first control signal or the second control signal is active.

2. The isolation voltage converter of claim 1, wherein the isolation voltage converter comprises a first operation mode and a second operation mode, the isolation voltage converter operates in the first operation mode during a normal load state, the isolation voltage converter operates in the second operation mode during a light load state; and wherein when the second control signal is active, the isolation voltage converter transits from the second operation mode to the first operation mode.

3. The isolation voltage converter of claim 2, wherein when the isolation voltage converter operates in the second operation mode, the controllable switch stops to switch on and off.

4. The isolation voltage converter of claim 2, wherein when the isolation voltage converter operates in the second operation mode, switching frequency of the controllable switch decreases.

5. The isolation voltage converter of claim 1, wherein the control module comprises:
    a voltage control circuit, configured to receive the voltage feedback signal, and further configured to generate the first control signal based on the voltage feedback signal; and
    a light load detection circuit, configured to receive the voltage feedback signal, and further configured to generate an indicator signal based on the voltage feedback signal, wherein the indicator signal configured to determine whether the isolation voltage converter is in the light load state, and wherein the indicator signal is active when the isolation voltage converter is in the light load state.

6. The isolation voltage converter of claim 2, wherein the control module comprises:
    a voltage control circuit, configured to receive the voltage feedback signal, and further configured to generate a fourth control signal based on the voltage feedback signal;
    a light load detection circuit, configured to receive the voltage feedback signal, and further configured to generate an indicator signal based on the voltage feedback signal, wherein the indicator signal is configured to determine whether the isolation voltage converter is in the light load state, and wherein the indicator signal is active when the isolation voltage converter is in the light load state; and
    a mode circuit, configured to determine the isolation voltage converter to operate in the first operation mode or the second operation mode based on the fourth control signal and the indicator signal, and further configured to provide the first control signal.

7. The isolation voltage converter of claim 6, wherein the isolation voltage converter further comprises a current feedback circuit configured to sense a current flowing through the controllable switch to generate a current feedback signal; and wherein the voltage control circuit is further configured to receive the current feedback signal, and configured to provide the fourth control signal based on the voltage feedback signal and the current feedback signal.

8. The isolation voltage converter of claim 1, wherein the isolation voltage converter further comprises:
    a protection circuit, configured to receive at least one protection signal, and further configured to compare the at least one protection signal with at least one threshold signal respectively to provide at least one control signal; and wherein
    the logic circuit further configured to receive the at least one control signal, and further configured to conduct a logic operation of the first control signal, the second control signal and the at least one control signal to generate the third control signal.

9. The isolation voltage converter of claim 6, wherein the ripple control circuit comprises:
    a ripple sense circuit, configured to sense ripples of the output voltage signal to generate the ripple signal; and
    a ripple comparing circuit, configured to compare the ripple signal with the ripple threshold to generate the second control signal.

10. The isolation voltage converter of claim 6, wherein the ripple control circuit comprises:
    a delay module, configured to receive the indicator signal at an input terminal, and further configured to provide a delay signal at an output terminal;
    a comparator having a first input terminal, a second input terminal, and an output terminal a first switch having a first terminal, a second terminal, a third terminal and a control terminal;
a second switch having a first terminal, a second terminal, a third terminal and a control terminal;
a voltage source;
a first capacitor, coupled between a first logic ground and the first terminal of the first switch; the second terminal of the first switch is coupled to the first input terminal of the comparator; the third terminal of the first switch is coupled to a second logic ground; and the control terminal of the first switch is configured to receive the delay signal; and
a second capacitor, coupled between the second logic ground and the first terminal of the second switch; the second terminal of the second switch is coupled to the second input terminal of the comparator through the voltage source; the third terminal of the second switch is coupled to the second logic ground; and the control terminal of the second switch configured to receive the delay signal; and wherein
when the isolation voltage converter is in the normal load state, the first terminal of the first switch is connected to the third terminal of the first switch, and the first terminal of the second switch is connected to the third terminal of the second switch; and wherein when the isolation voltage converter is in the light load state, the first terminal of the first switch is connected to the second terminal of the first switch, and the first terminal of the second switch is connected to the second terminal of the second switch.

11. The isolation voltage converter of claim 1, wherein the ripple control circuit comprises:
a comparator having a first input terminal, a second input terminal and an output terminal;
a voltage source, configured to provide the ripple threshold;
a first capacitor, wherein when the isolation voltage converter is in a normal load state, the first capacitor is coupled between a first logic ground and a second logic ground; and wherein when the isolation voltage converter is in the light load state, the first capacitor is coupled between the first logic ground and the first input terminal of the comparator; and
a second capacitor, when the isolation voltage converter is in the normal load state, the second capacitor is coupled between an output terminal of the isolation voltage converter and the second logic ground; When the isolation voltage converter is in the light load state, the second capacitor is coupled between the output terminal of the isolation voltage converter and the second input terminal of the comparator through the voltage source; and wherein
the difference of the first input terminal and the second input terminal of the comparator is indicative of the ripple signal, and the comparator compares the ripple signal with the ripple threshold to provide the second control signal at the output terminal.

12. The isolation voltage converter of claim 1, wherein when the controllable switch is turned on, the primary winding stores energies; when the controllable switch is turned off, the secondary winding transmits the energy stored in the primary winding to a load of the isolation voltage converter.

13. The isolation voltage converter of claim 6, wherein light load detection circuit comprises:
an amplifying circuit, configured to receive the voltage feedback signal and the voltage reference signal, and further configured to amplify difference of the voltage feedback signal and the voltage reference signal to generate an error signal; and
a second comparing circuit, configured to receive the error signal and a light load threshold, and further configured to compare the error signal with the light load threshold to generate the indicator signal.

14. A control circuit for a primary side regulated isolation voltage converter, comprising:
a control module, configured to determine whether the isolation voltage converter is in a light load state, and further configured to receive a voltage feedback signal generated by a tertiary winding of a transformer of the primary side regulated isolation voltage converter, and further configured to provide a first control signal based on the voltage feedback signal, wherein the first control signal is active when the voltage feedback signal is smaller than a desired reference signal; and
a ripple control circuit, configured to sense ripples of the output voltage signal to generate a ripple signal when the isolation voltage converter is in the light load state, and further configured to compare the ripple signal with a ripple threshold to generate a second control signal, wherein the second control signal is active when the ripple signal is larger than the ripple threshold; and wherein
the control circuit is configured to turn a controllable switch of the primary side regulated isolation voltage converter on when either the first control signal or the second control signal is active.

15. A control method used for a primary side regulated isolation voltage converter, comprising:
generating a voltage feedback signal by a tertiary winding of a transformer of the primary side regulated isolation voltage converter;
determining whether the isolation voltage converter is in a light load state based on the voltage feedback signal;
sensing ripples of an output voltage signal to generate a ripple signal once the isolation voltage converter is in-a the light load state;
determining whether the ripple signal is larger than a ripple threshold; and
making the isolation voltage converter come out of the light load state once the ripple signal is larger than the ripple threshold.

16. The control method of claim 15, wherein the isolation voltage converter comprises a controlled switch, an input voltage signal is converted to the output voltage signal by switching the controllable switch on and off, and wherein when the isolation voltage converter is in the light load state, the controllable switch stops to switch on and off.

17. The control method of claim 15, wherein the isolation voltage converter comprises a controlled switch, an input voltage signal is converted to the output voltage signal by switching the controllable switch on and off, and wherein when the isolation voltage converter is in the light load state, switching frequency of the controllable switch decreases.

18. The control method of claim 15, wherein sensing a ripple signal of an output voltage signal once the isolation voltage converter is in a light load state comprises using a ripple sense circuit, and wherein the ripple sense circuit having a first input terminal, a second input terminal, a first output terminal and a second output terminal comprises:
a first capacitor having a first terminal and a second terminal, the first terminal of the first capacitor operated as the first input terminal of the ripple sense circuit is connected to a first logic ground; when the isolation voltage converter is in a normal load state, the second terminal of the first capacitor is connected to a second logic ground; when the isolation voltage converter is in the light load state, the second terminal of the first capacitor operated as the first output terminal of the ripple sense circuit; and a second capacitor having a first terminal and a second terminal, the first terminal of the second capacitor operated as the second input terminal of the ripple sense circuit is connected to the output terminal of the isolation voltage converter; when the isolation voltage converter is in the normal load state, the second terminal of the second capacitor is connected to the second logic ground; when the isolation voltage converter is in the light load state, the second terminal of the second capacitor operated as the second output terminal of the ripple sense circuit; and wherein the difference of the first output terminal of the ripple sense circuit and the second output terminal of the ripple sense circuit is indicative of the ripple signal.

* * * * *